United States Patent [19]

McGuckin et al.

[11] Patent Number: 5,457,706
[45] Date of Patent: Oct. 10, 1995

[54] TUNABLE CW DIODE-PUMPED TM,HO:YLIF$_4$ LASER OPERATING AT OR NEAR ROOM TEMPERATURE

[75] Inventors: Brendan T. McGuckin; Robert T. Menzies, both of Pasadena, Calif.

[73] Assignee: The United States of America as represented by the Administrator of the National Aeronautics and Space Administration, Washington, D.C.

[21] Appl. No.: 44,668

[22] Filed: Mar. 30, 1993

[51] Int. Cl.$^6$ .................................................. H01S 3/10
[52] U.S. Cl. ........................... 372/20; 372/29; 372/32
[58] Field of Search ............................ 372/20, 32, 29

[56] References Cited

U.S. PATENT DOCUMENTS

| | | | |
|---|---|---|---|
| 3,998,256 | 3/1991 | Ohshima et al. | 372/32 |
| 4,132,962 | 1/1979 | Yang et al. | 372/20 |
| 4,797,893 | 1/1989 | Dixon | 372/66 |
| 4,901,330 | 2/1990 | Wolfram et al. | 372/75 |
| 4,965,803 | 10/1990 | Esterowitz et al. | 372/5 |
| 4,969,150 | 11/1990 | Esterowitz et al. | 372/20 |
| 4,974,230 | 11/1990 | Hemmati | 372/41 |
| 5,042,042 | 8/1991 | Hori et al. | 372/32 |
| 5,048,031 | 9/1991 | Thonn | 372/33 |
| 5,068,861 | 11/1991 | Abbott et al. | 372/20 |
| 5,107,509 | 4/1992 | Esterowitz et al. | 372/20 |
| 5,144,632 | 9/1992 | Thonn | 372/33 |
| 5,159,601 | 10/1992 | Huber | 372/6 |
| 5,161,165 | 11/1992 | Zorabedian | 372/20 |

Primary Examiner—Georgia Y. Epps
Attorney, Agent, or Firm—John H. Kusmiss; Thomas H. Jones; Guy M. Miller

[57] ABSTRACT

A conversion efficiency of 42% and slope efficiency of 60% relative to absorbed pump power are obtained from a continuous wave diode-pumped Tm, Ho:YLiF$_4$ laser at 2 μm with output power of 84 mW at a crystal temperature of 275 K. The emission spectrum is etalon tunable over a range of 7 nm (16.3 cm$^{-1}$) centered on 2.067 μm with fine tuning capability of the transition frequency with crystal temperature at a measured rate of $-0.03$ cm$^{-1}$ $\cdot$ K$^{-1}$. The effective emission cross-section is measured to be $5\times10^{-21}$ cm$^2$. These and other aspects of the laser performance are disclosed in the context of calculated atmospheric absorption characteristics in this spectral region and potential use in remote sensing applications. Single frequency output and frequency stabilization are achieved using an intracavity etalon in conjunction with an external reference etalon.

10 Claims, 7 Drawing Sheets

TUNABLE CW DIODE-PUMPED TM,HO:YLIF$_4$ LASER OPERATING AT OR NEAR ROOM TEMPERATURE

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The invention relates generally to precise control of diode laser pumped Tm, Ho:YLiF$_4$ laser emission wavelength by means of angle tuning of an intracavity, uncoated quartz etalon and by control of Tm, Ho:YLiF$_4$ laser crystal temperature. A quartz etalon of thickness 0.25 mm in the laser cavity, is rotated relative to the optical axis of the laser to tune wavelength. Laser crystal temperature may also be used to change the emission wavelength. Stabilization of the emission wavelength is obtained relative to an external cavity using a reference etalon.

BACKGROUND ART

Eyesafe 2 μm holmium lasers are of considerable topical interest, having potential use in diverse applications such as altimetry, ranging, low altitude wind shear detection and avoidance, and in atmospheric remote sensing including Doppler lidar wind sensing and water vapor profiling by differential absorption lidar. For next generation instruments, a diode-pumped solid-state transmitter would proffer extended lifetime and higher efficiency as potential benefits. The thulium, holmium-doped yttrium lithium fluoride (or Tm,Ho:YLiF$_4$) laser potential for atmospheric remote sensing depends on the ability to tune it to either atmospheric window regions or to regions where gases of interest selectively absorb the laser radiation. $CO_2$ and $H_2O$ absorption features overlap the emission spectrum of the laser. These attenuate the beam when the laser frequency overlaps one of these features and reduce the effective range of the laser beam through the atmosphere. However, it is possible with this laser to tune the wavelength into the high transmissivity regions between these absorption features if the application (such as ranging) so requires.

STATEMENT OF THE INVENTION

Disclosed herein is efficient performance from a diode laser-pumped thulium holmium yttrium lithium fluoride (Tm,Ho:YLiF$_4$) laser operating near 2.067 μm on the $^5I_7$–$^5I_8$ transition in holmium. An absolute conversion efficiency of 42% and slope efficiency of 60% relative to absorbed pump power are recorded with a peak continuous wave (CW) output power of 84 mW at a temperature of 275 K. The emission spectrum is etalon tunable over 7 nm centered on 2.067 μm with a $-3$ cm$^{-1}$ .100 K.$^{-1}$ thermal fine-tuning capability of the transition. The measured effective emission cross-section of $5 \times 10^{-21}$ cm$^2$ and other aspects of the laser performance will be discussed.

The observed gain and efficiency are noteworthy characteristics for both lidar applications and compact spectroscopic sensor applications. The tuning range spans atmospheric carbon dioxide and water vapor lines with high transmissivity regions between the lines. Notwithstanding the slightly higher pump thresholds when compared to yttrium aluminum garnet (YAG), advocacy of YLF as a suitable host is based upon salient factors such as the high slope conversion efficiencies, and reduced up-conversion losses when compared to other hosts. Further, it has been demonstrated that Tm,Ho:YLiF$_4$ exhibits a stored excitation energy distribution conducive to efficient energy extraction when operated in Q-switched mode. Furthermore, an insensitivity to thermally induced beam depolarization due to the uniaxial crystalline nature and minimal thermal lensing in YLF are important attributes in a material with potential for multi-joule laser development.

OBJECTS OF THE INVENTION

It is therefore a principal object of the present invention to provide an efficient tunable continuous wave (CW) diode-pumped thulium holmium yttrium lithium fluoride laser operating at or near room temperature.

It is another object of the present invention to provide a tunable frequency stabilized diode-laser-pumped Tm,Ho:YLiF$_4$ laser operating at or near room temperature with precise control of emission wavelength.

It is still an additional object of the present invention to provide a Tm,Ho:YLiF$_4$ CW laser having precise emission wavelength control by means of angle tuning of an intracavity, uncoated quartz etalon and by control of Tm,Ho:YLiF$_4$ laser crystal temperature.

It is still an additional object of the invention to provide a diode laser pumped single frequency thulium holmium yttrium lithium fluoride laser having a tunable output wavelength and frequency stabilization relative to an external reference etalon and exhibiting an output power of around 25 mWatts at or near room temperature.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which:

FIG. 6 comprising

DETAILED DESCRIPTION OF A PREFERRED EMBODIMENT

The Tm,Ho:YLiF$_4$ laser crystal was grown along the a-axis with 6% Tm and 0.4% Ho composition with corresponding impurity in concentrations of [Tm$^{3+}$]~$8.39 \times 10^{20}$cm$^{-3}$ and [Ho$^{3+}$]~$5.59 \times 10^{19}$cm$^{-3}$. The optimum crystal length for use at 275 K. was previously determined, the 2.18 mm long crystal selected being the best compromise between minimizing re-absorption losses and optimal gain length for this composition.

Figure 1:
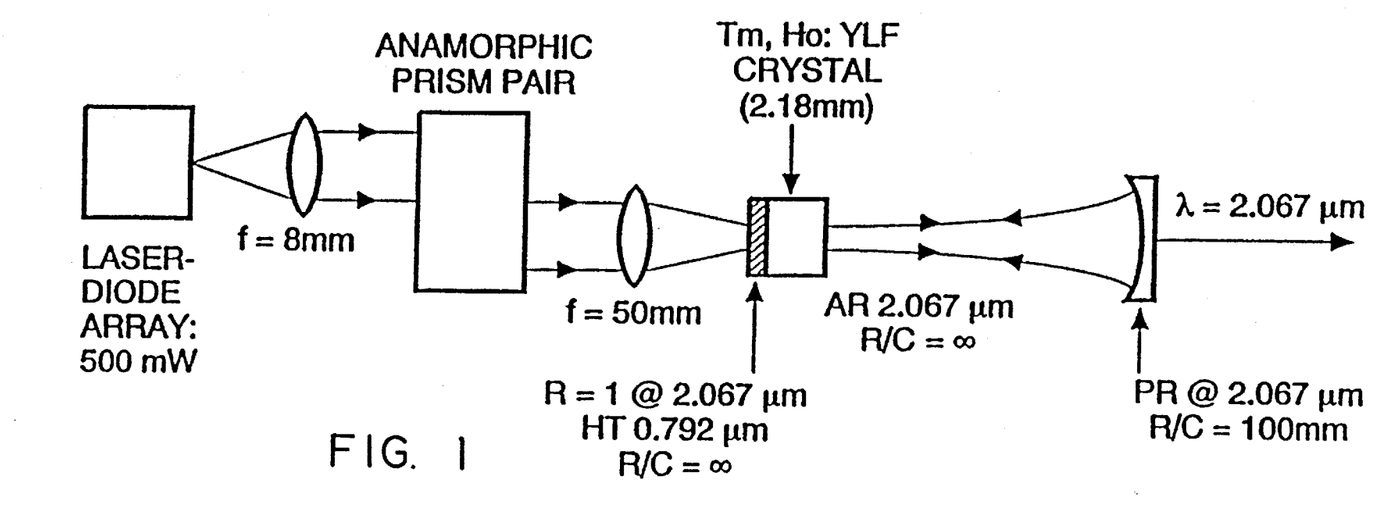
FIG. 1 is a block diagram of the optical train used in an embodiment of the invention.

The optical train is illustrated in FIG. 1. The laser crystal is axially pumped by a single Spectra Diode Labs (SDL-820) 500 mW GaAlAs diode laser tuned to 792 nm. The elliptical pattern of the collimated output beam is near circularized by the anamorphic prism pair affording improved alignment stability and output performance (at the expense of a 9% transmission loss). The beam is focussed onto the laser crystal by the 5 cm focal length doublet lens. The near hemispherical Ho-laser resonator is formed between the crystal "input" face and a 10 cm radius of curvature mirror. A dichroic coating On the input face is 88% transmitting at 792 nm but has unity reflectivity near 2 µm. The crystal "output" face is anti-reflection (AR) coated at both pump and generated wavelengths. The output coupler is 99% reflecting at 2 µm. The π-spectrum absorption coefficient at 275 K. is 3.88 cm$^{-1}$.

Temperature control of the laser crystal is achieved by a single-stage thermo-electric (TE) cooler and variable D.C. current supply. An Omega 44030 precision thermistor, bonded onto the laser crystal, is used for temperature measurement. The integrity of the bond and readings are periodically verified by a temperature probe brought into direct contact with the crystal at a point adjacent to the thermistor. Condensation on the crystal surfaces is obviated by maintaining the crystal-cooler assembly in a flowing dry nitrogen gas atmosphere. The pump power and the filtered output power from the holmium laser are measured using calorimetric power meters.

Figure 2:
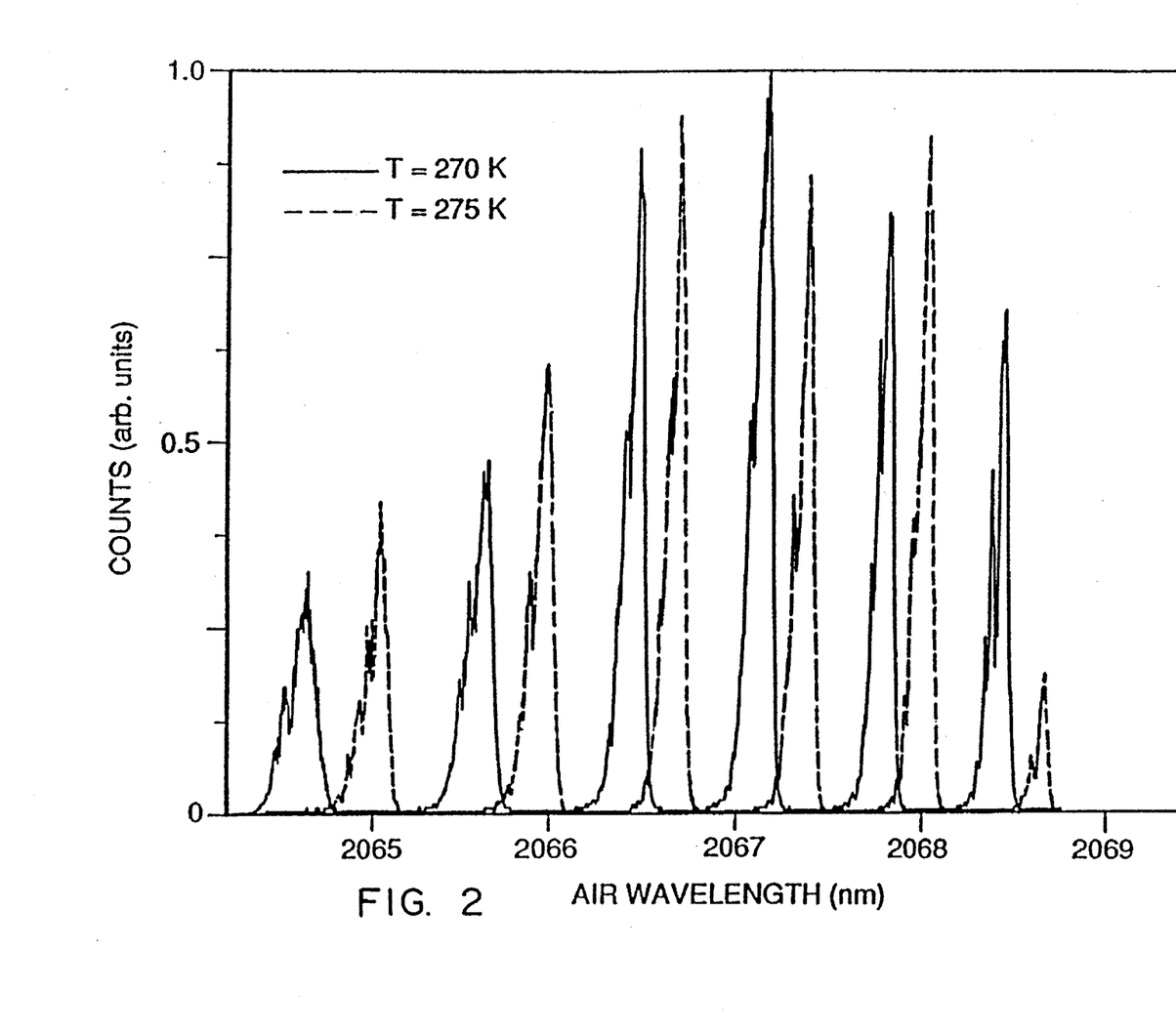
FIG. 2 is a graph of output power versus absorbed pumped power for the laser of the invention.

For a crystal temperature of 275 K., the Ho-laser output as a function of absorbed pump power is illustrated in FIG. 2. The extrapolated threshold absorbed pump power is ~60 mW. The maximum output power is 84 mW for an absorbed power of 200 mW, corresponding to 42% conversion efficiency. Typically, 51% of the pump power is absorbed in the crystal, therefore the slope efficiency relative to the absorbed pump power ($n_{slope}$) is 60% and is believed to be the highest reported to date from a Tm,Ho:YLiF$_4$ laser operating near room temperature. When operating the laser on a single frequency, the laser crystal was maintained at slightly higher temperatures. Upon raising the crystal temperature to 298 K., the output power was measured to be ~35 mW. However, when using the intracavity etalon as a frequency discriminant, this fell to 25 mW due to intracavity losses associated with reflections from the etalon surfaces. The influence of the resonant Tm-Ho energy transfer in reducing the Stokes losses is manifest here also as an effective quantum efficiency $n_p=1.57$ for the pumping process. Evidently this is being moderated from the $n_p$~2 anticipated from theoretical analysis of the performance of these materials. This is considered to be due to the deleterious influence of up-conversion processes on the pumping dynamics and also the relatively high operating temperature.

The primary up-conversion loss mechanism has been identified as the removal of Ho-ions from the $^5I_7$ upper laser level by up-conversion with a Tm-ion in the $^3F_4$ manifold. The Ho-ion is excited to the $^5I_5$ level from where it then relaxes back to the Tm-Ho manifold via phonon emission. A secondary and less influential up-conversion process giving rise to the distinctive visible fluorescence accompanying lasing is also active. A 0.5 m path length monochromator and photomultiplier tube were used to record this fluorescence Spectrum between 400 nm and 800 nm. The peak wavelengths observed and probable transition assignments are: 486 nm ($^5F_3+^5I_8$), 514–530 nm ($^5S_2+^5I_8$), 600–630 nm ($^5F_5+^5I_8$) and 700–770 nm ($^5S_2+^5I_7$), the most distinctive of which is the $^5S_2+^5I_8$ green fluorescence.

Figure 3:
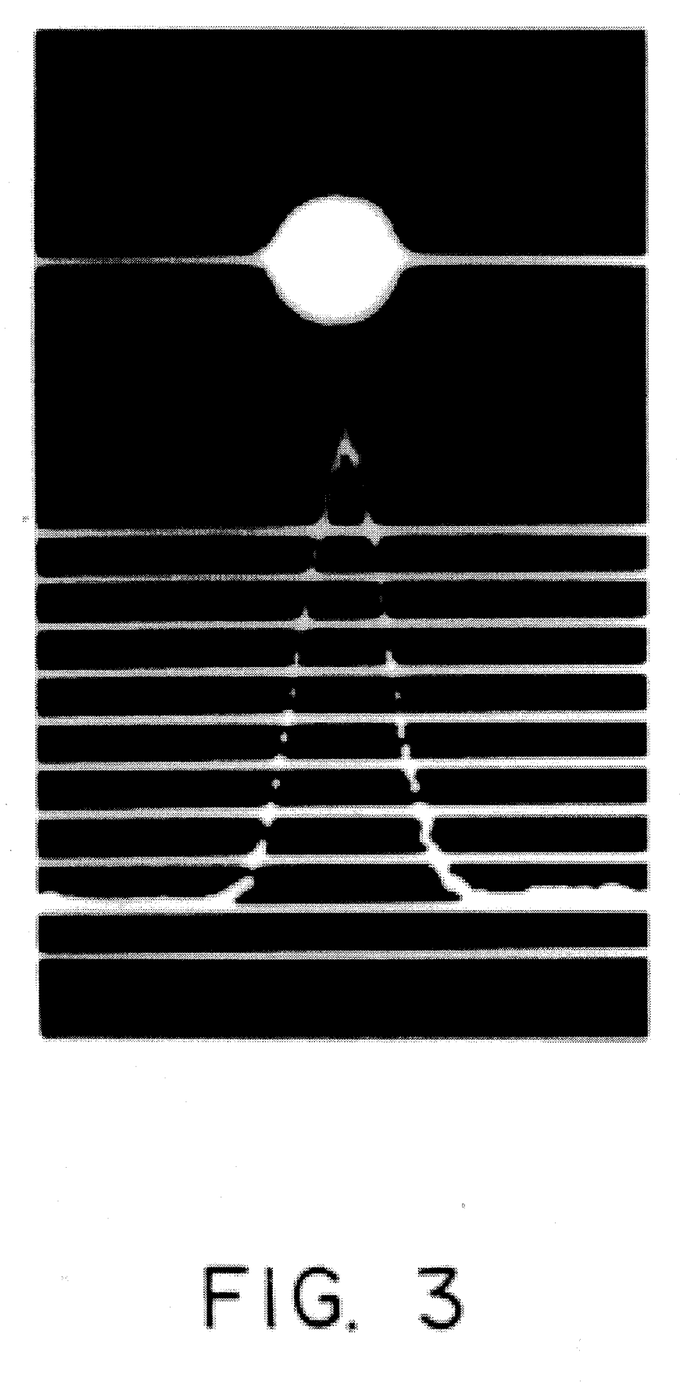
FIG. 3 is a video digitizer-produced graph of the spatial energy distribution output beam profile of the laser hereof.

The spatial energy distribution of the Ho-laser was recorded using a vidicon T.V. camera and video digitizer system. The output beam profile is shown in FIG. 3. From this it is apparent that the laser is operating, on a single transverse mode (TEM$_{oo}$). TEM$_{oo}$ operation is routinely achieved, despite the original lobed pattern of the pump laser, and is also attributed to the circularization of the pump beam shape by the anamorphic prism pair. The improved pump beam pattern also enables a smaller focussed spot size onto the laser crystal allowing more pump energy to be coupled into the fundamental mode with resultant improvements in laser efficiency. The plane of polarization of the 2 µm emission was determined by monitoring the spectrum through an optic oriented at Brewster's angle and is p-polarized with respect to the pump beam E-vector.

Tunability is of interest in a laser with possible applications in remote sensing. Accordingly, the laser output spectrum and its sensitivity to crystal temperature, and control by an intracavity etalon, have been investigated. Wavelength measurements were made using a Spex 1700-II spectrometer. The 0.75 m unit has a first order theoretical resolution of 0.035 nm using a 600 g.mm$^{-1}$ ruled grating, although the typical resolution attained in practice was 0.042 nm (0.098 cm$^{-1}$) at the emission wavelength. A liquid nitrogen-cooled mercury cadmium telluride detector monitored the energy transmitted through the spectrometer and phase synchronous detection was used to improve the signal to noise ratio.

Figure 4:
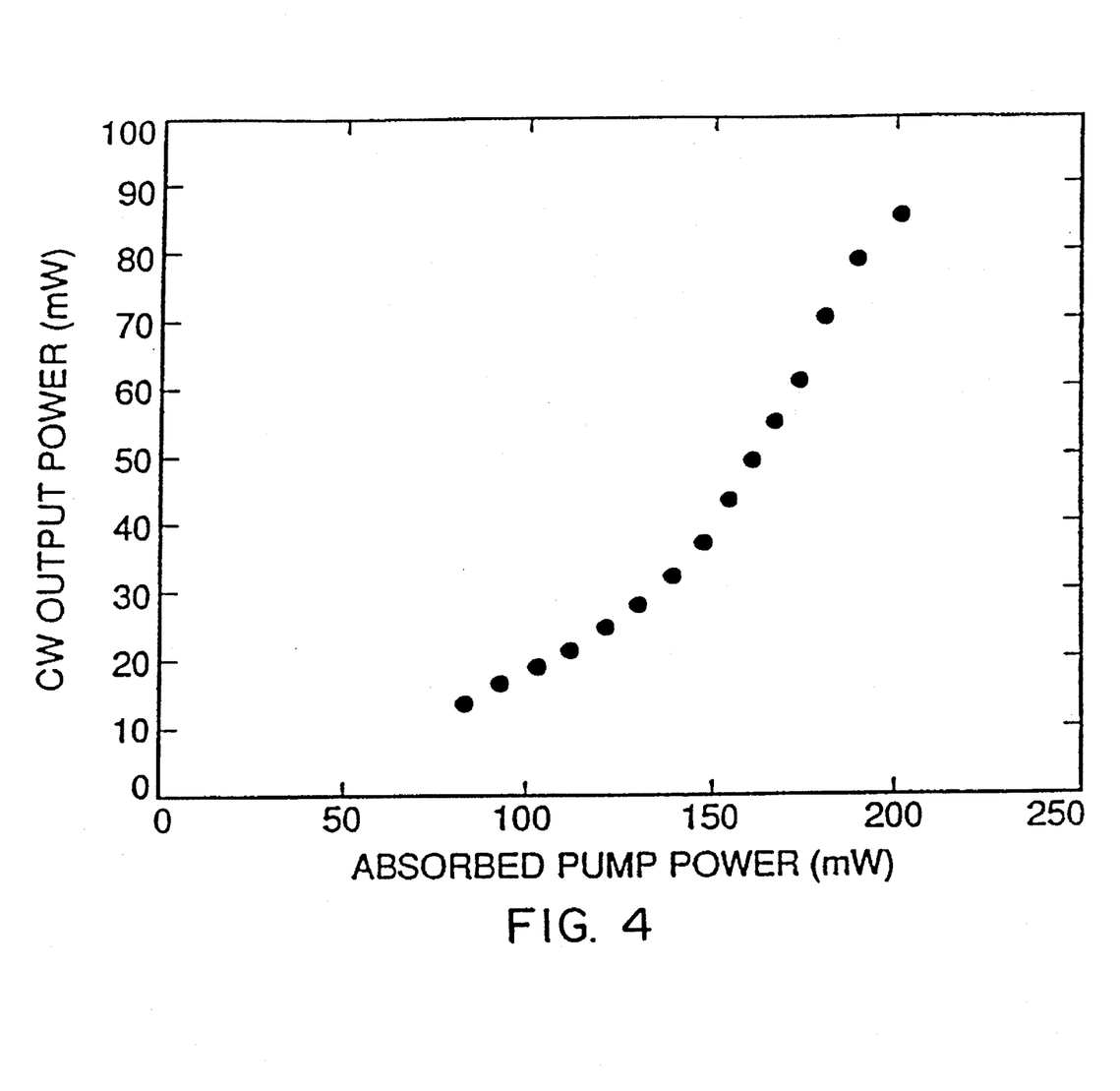
FIG. 4 is a spectral graph of output of the inventive laser at two different temperatures.
Figure 5:
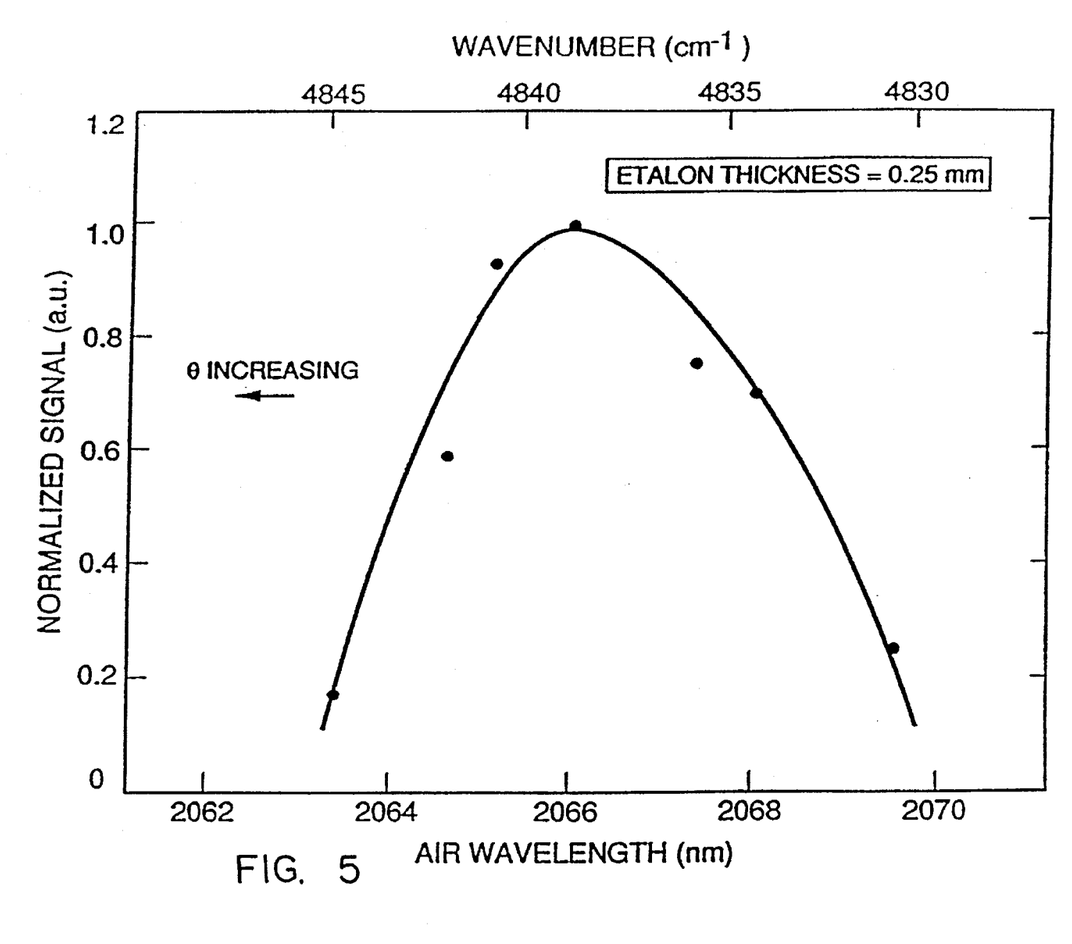
FIG. 5 is a graphical representation of the tunability of the inventive laser.

A typical spectrum is shown in FIG. 4. Recorded at 275 K., this consists of 6 distinct peaks between 2.064 and 2.07 µm separated by 0.6–0.7 nm. The laser emission calibration included, in addition to the monochromator calibration with several He—Ne orders, the observation of transmission spectra through a 3 atm-m path of $CO_2$, where line positions in the 2 $u_1+u_3$ band are known to an accuracy of better than 0.005 cm$^{-1}$. The discontinuous emission spectrum is attributed to Fabry-Perot action in the laser crystal, the spacing corresponding to that expected from the refractive index and length of crystal used. The crystal is susceptible to this behavior due to the large product of the surface reflectivities at the resonant wavelength. The 0.25 mm etalon is chosen to have a free spectral range greater than the laser crystal so as to restrict oscillation to one fringe. Due to the homogeneously broadened transition, the effect of the etalon is to extend the width of the spectrum by concentrating the available gain into one mode, thereby accessing regions further from the center of the gain bandwidth. As illustrated in FIG. 5, for a temperature of 256 K. the laser is tunable over 7 nm (16 cm$^{-1}$). This requires an etalon rotation of 7° of the 0.25 mm etalon used here. This tuning range is consistent with previous observations of this transition in diode-laser pumped Tm,Ho:YAG and Ho:YSGG and in flashlamp excited Tm,Ho:YLiF$_4$. The insertion losses due to the etalon reduce the output power by 60%, primarily due to the short, highly divergent cavity design used. Extending the length of the resonator and locating the etalon close to the beam waist will effect an improvement.

In the absence of the etalon, the temperature sensitivity of the emission spectrum reveals a central fringe shift of ~4.55×10$^{-2}$ nm.K$^{-1}$ (0.106 cm$^{-1}$ .K$^{-1}$). This motion is the result of two distinct effects: The envelope under which the fringes move exhibits a red-shift with increasing crystal temperature at a rate of ~1.3×10$^{-2}$ nm.K$^{-1}$ (0.03 cm$^{-1}$ .K$^{-1}$), and is considered to be due to the laser transition tuning with temperature. The secondary effect involves thermally induced changes in the crystal length. The thermal expansion coefficient of YLF is 13×10$^{-6}$ K$^{-1}$, which at 2.067 µm would effect a fringe movement of $2.7\times10^{-2}$ nm.K$^{-1}$ (0.063 cm$^{-1}$ .K$^{-1}$). This in conjunction with the transition motion largely accounts for the total observed movement of the central fringes. A transition temperature sensitivity of this magnitude would facilitate thermal tuning of the emission wavelength through atmospheric $CO_2$ absorption lines ($2v_1+v_3$ band) which are predominant in this spectral region.

Analysis of the threshold pump power with different output coupler reflectivities at a crystal temperature of 256 K. reveals an effective π-spectrum absorption coefficient at the resonant wavelength $\alpha_L$=0.065 cm$^{-1}$, considering absorption to be the sole loss mechanism. Using the energy level scheme of Castleberry and, assuming a Boltzmann approximation for the population distribution of the Tm, $^3F_4$–Ho $^5I_7$ coupled system and the Ho$^5I^8$ground state, the occupation factor of the lower laser level (317 cm$^{-1}$) is $f_L$=0.019. This results in an emission cross-section of a $\sigma_e$~$6\times10^{-20}$ cm$^2$, which is slightly higher than that calculated from the σ-spectrum in the same material. The effective emission cross-section, $\sigma_{eff}$, can be obtained from the threshold small-signal gain coefficient ($g^o$~0.065 cm$^{-1}$). At this temperature 23% of the Ho-concentration must be inverted to achieve threshold, translating into $\sigma_{eff}$=$5\times10^{-21}$ cm$^2$. This should be compared to 17% and $\sigma_{eff}$=$9\times10^{-21}$ cm$^2$ measured at 2.091 μm in Tm,Ho:YAG of the same relative Tm/Ho composition as that used here. In Q-switched oscillator amplifier systems, the lower $\sigma_{eff}$ in Tm, Ho:YLiF$_4$ may facilitate higher energy storage densities, the material being less susceptible to parasitic oscillations.

Figure 6A:
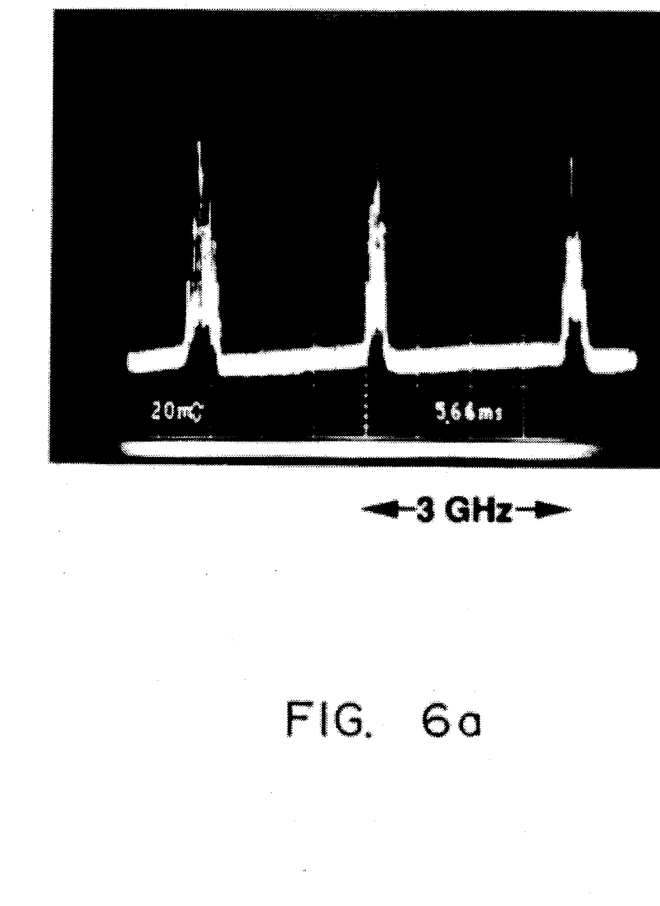
FIGS. 6a and 6b is a pair of spectral recordings of the laser output illustrating the effect of the intracavity etalon used in the laser of the invention.
Figure 6B:
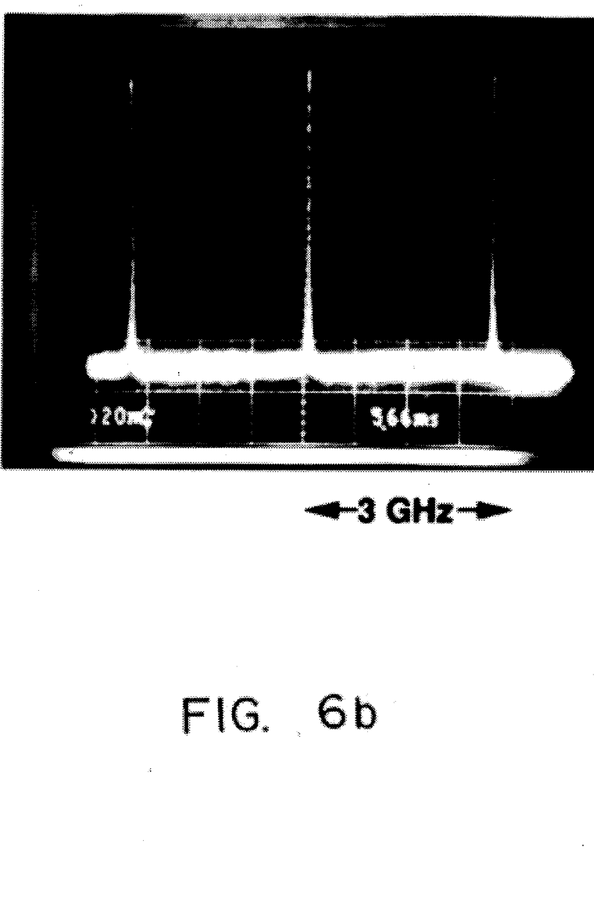

For many potential applications the control of the laser axial mode control is important. The laser output spectrum as recorded using a scanning confocal Fabry-Perot etalon with a 3 GHz free spectral range (FSR) is shown in FIG. 6. Evident in FIG. 6 is a fringe pattern consistent with multi-axial mode oscillation. Next to the main confocal etalon fringes, separated from them by 0.15 GHz, are auxiliary lower amplitude modes. These are in fact paired with the next order etalon fringe located 3 GHz away for a total mode separation of 3.15 GHz, corresponding to the laser resonator free spectral range. The fringe pattern exhibits rapid amplitude fluctuations and general instability consistent with mode competition.

The effect of the intracavity etalon is manifest in FIG. 6, where a fringe pattern consistent with single axial mode oscillation is depicted. Coarse angle tuning of the etalon and tuning of the resonator length by means of a PZT element on the cavity output coupler are required to create the most favorable balance between the gain as modulated by the etalon fringe and the location of an axial mode relative to the gain curve maximum, resulting in single frequency output. Once attained, the amplitude stability is very good, fluctuations being <5%, and no evidence of mode hopping is observed. Aware of the fact that the analyzing etalon and laser resonator free spectral ranges are relatively close (3.0 and 3.15 GHz, respectively) any ambiguity so caused in deducing the spectral purity of the single frequency output was addressed by analyzing an individual etalon fringe at the limit of resolution of the instrument. This is achieved by progressively reducing the ramp voltage applied to the scanning etalon PZT at a fixed bias voltage while monitoring the laser mode spectrum with progressively higher resolution, with the shortest possible scan period of 20 ms. The symmetrical mode shape was maintained throughout and no evidence of a second mode (which would cause an asymmetry or inflection on either side of the fringe) was observed. An uncompensated drift rate of 2.5 MHz min$^{-1}$ is deduced from observations of the fringe pattern drift over many hours, highlighting the need for external stabilization.

Figure 7:
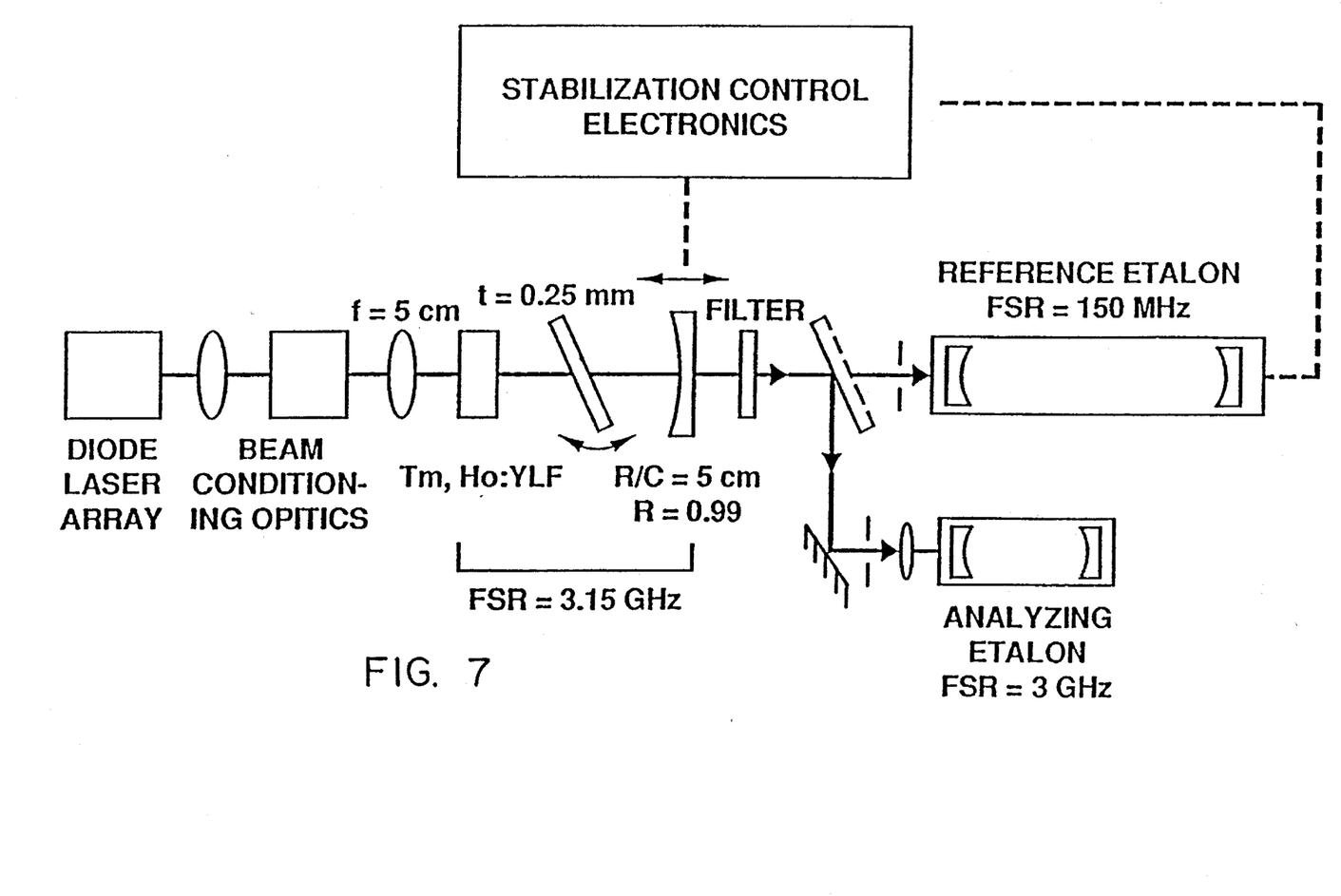
FIG. 7 is a block diagram illustration of an arrangement for stabilizing the laser frequency relative to the transmission characteristic of an external reference confocal cavity.

Stabilization of the laser frequency relative to an external reference confocal cavity was achieved using the arrangement illustrated in FIG. 7. The reference etalon is a Burleigh temperature stabilized confocal instrument of the same type as that used above but with a 150 MHz FSR. The etalon optics were originally specified for use at another wavelength; however; the coating on the ZnSe substrates allowed sufficient 2 μm transmission and formation of fringes of sufficient finesse (≈5) with which to achieve lock. Locked status is immediately apparent on the 3 GHz etalon fringe pattern with the absence of long-term drift and significantly reduced short term fluctuations. The output frequency is tunable by adjustment of the bias to the PZT of the controlling etalon and a continuous single-mode tuning range of 800 MHz is routinely possible. By mounting the laser cavity elements on an invar base, improved frequency stability is possible.

Over a period of many seconds, short term frequency jitter of approximately 1 MHz is observed with a PZT ramp period of 20 ms. In this configuration the error signal is derived from the dither signal applied to the 150 MHz confocal etalon. (Due to the low finesse fringes it initially proved difficult to set up the servo-control electronics, a situation alleviated by reversing the roles of the two etalons in the set-up. The higher finesse fringes (~166) obtained using the 3 GHz device are more conducive to realizing stable lock, which facilitated establishment of proper control settings on the lock-in amplifier and dither signal generator.) In an alternate configuration, frequency lock was obtained when the dither voltage was applied directly to the laser PZT. However, although locked status was again achieved, the modulation on the laser output was considered to be less desirable.

CONCLUSIONS

In conclusion, efficient, tunable operation of a Tm,Ho:YLiF$_4$ laser has been demonstrated at temperatures in the 250–275 K. range. Output power of 84 mw corresponding to slope conversion efficiencies of 60% relative to the absorbed pump power is obtained. The emission spectrum is etalon tunable over 7 nm centered on 2.067 μm. A measured transition temperature sensitivity of 0.03 cm$^{-1}$ .K$^{-1}$ is recorded facilitating fine tuning through atmospheric $CO_2$ and $H_2O$ absorption lines overlapping the emission spectrum. An effective emission cross-section of $5\times10^{-21}$ cm$^2$ is measured which points to improved energy storage capacity over other hosts. Stabilization of the single frequency output relative to an external cavity is also obtained with the demonstration of a continuous single-mode tuning range of 800 MHz. Closed-loop short term stability of 1 MHz was obtained, with the maintenance of single mode long term stability over many hours.

Having thus described a preferred embodiment of the invention, what is claimed is:

1. A CW Tm,Ho:YLiF$_4$ laser comprising a laser resonator, a pumping medium, energy abstracting means and an intracavity etalon rotatable relative to the optical axis of the laser for tuning the emission wavelength of the laser.

2. The laser recited in claim 1 wherein said intracavity etalon is about 0.25 mm in thickness.

3. The laser recited in claim 1 wherein said emission wavelength is about 2.067 μm.

4. The laser recited in claim 3 wherein at a laser temperature of 275 K. said intracavity etalon provides tuning over a wavelength range of at least 7 nm and a temperature controlled fine tuning capability of $-0.03$ cm$^{-1}$ .K$^{-1}$.

5. The laser recited in claim 1 wherein said laser comprises a Tm,Ho:YLiF$_4$ laser crystal grown along the a-axis with 6% Tm and 0.4% Ho composition.

6. The laser recited in claim 5 wherein said laser crystal is about 2–4 mm in length.

7. The laser recited in claim 1 wherein said Tm,Ho:YLiF$_4$ laser comprises a diode laser configured for axially pumping a Tm,Ho:YLiF$_4$ laser crystal.

8. The laser recited in claim 7 wherein said diode laser is tuned to a wavelength of 792 nm and is focussed onto said laser crystal by a lens.

9. The laser recited in claim 1 wherein said intracavity etalon is made of quartz and has no optical coatings on either of its two faces.

10. The laser recited in claim 1 wherein said emission wavelength is stabilized by a closed loop employing an external confocal cavity reference etalon and a PZT element on the laser cavity output coupler.

* * * * *